US011243845B2

(12) United States Patent
Zhao et al.

(10) Patent No.: US 11,243,845 B2
(45) Date of Patent: Feb. 8, 2022

(54) METHOD AND DEVICE FOR DATA BACKUP (71) Applicant: EMC IP Holding Company LLC, Hopkinton, MA (US)

(72) Inventors: Frank Junping Zhao, Beijing (CN); Jie Bao, Shanghai (CN); Kun Wang, Beijing (CN); Ricky Yuxi Sun, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 1206 days.

(21) Appl. No.: 15/622,387

(22) Filed: Jun. 14, 2017

(65) Prior Publication Data

US 2017/0357553 A1 Dec. 14, 2017

(30) Foreign Application Priority Data

Jun. 14, 2016 (CN) .................... 201610421617.X (51) Int. Cl.
G06F 11/14 (2006.01)
H04L 29/06 (2006.01)
G06F 16/907 (2019.01)

(52) U.S. Cl.
CPC ...... *G06F 11/1464* (2013.01); *G06F 11/1453* (2013.01); *G06F 16/907* (2019.01); *G06F 2201/805* (2013.01); *H04L 63/0428* (2013.01)

(58) Field of Classification Search
CPC .................. G06F 11/1464; G06F 11/1453
See application file for complete search history.

(56) References Cited

U.S. PATENT DOCUMENTS

| 9,128,627 | B1* | 9/2015 | Bachu | G06F 11/1456 |
| 9,275,060 | B1 | 3/2016 | Supekar | |
| 10,152,246 | B1* | 12/2018 | Lieberman | G06F 11/1471 |
| 10,430,293 | B1* | 10/2019 | Skowronski | G06F 11/1458 |
| 10,445,186 | B1* | 10/2019 | vonThenen | G06F 9/445 |
| 2011/0010515 | A1* | 1/2011 | Ranade | G06F 11/1466 |
| | | | | 711/162 |
| 2014/0180664 | A1* | 6/2014 | Kochunni | G06F 11/3442 |
| | | | | 703/21 |

(Continued)

FOREIGN PATENT DOCUMENTS

| CN | 101090330 | 12/2007 |
| CN | 101996108 | 3/2011 |
| CN | 102158540 | 8/2011 |

(Continued)

*Primary Examiner* — James Trujillo
*Assistant Examiner* — Kurt A Mueller
(74) *Attorney, Agent, or Firm* — BainwoodHuang (57) ABSTRACT Embodiments of the present disclosure relate to a method and an apparatus for data backup. The method comprises selecting, from a service store, a backup service for an application. The method further comprises setting, for the application, configuration information associated with the selected backup service. Additionally, the method further comprises in response to the backup service being enabled, deploying a backup service agent corresponding to the backup service to a source node associated with the application based on the configuration information, such that data of the application is backed up from the source node to a target node via the backup service agent.

18 Claims, 9 Drawing Sheets (56) References Cited

U.S. PATENT DOCUMENTS

2014/0196056 A1* 7/2014 Kottomtharayil ... G06F 9/45533
718/105
2016/0147944 A1 5/2016 Douglass

FOREIGN PATENT DOCUMENTS

| CN | 104216793 | 12/2014 |
| CN | 104765651 | 7/2015 |

* cited by examiner

METHOD AND DEVICE FOR DATA BACKUP

RELATED APPLICATIONS

This application claim priority from Chinese Patent Application Number CN201610421617.X, filed on Jun. 14, 2016 at the State Intellectual Property Office, China, titled "METHOD AND DEVICE FOR DATA BACKUP" the contents of which is herein incorporated by reference in its entirety.

FIELD

Embodiments of the present disclosure relate to data storage, and specifically relate to a method and an apparatus for data backup.

BACKGROUND

Data backup refers to a process of replicating all or part of data sets from a storage disk or array on an application host to other storage medium so as to prevent data loss due to a misoperation or failure of a system. In order to meet a good recovery time objective (RTO) and/or recovery point objective (RPO) as well as rich data features such as deduplication, compression or encryption, a traditional data backup system is usually implemented as a hardware with a tight-couple software, which is constructed for a certain purpose. For example, the traditional data backup system generally serves an application that is deployed at a fixed physical node, and replicates data from the node where the application is deployed to a target node specifically optimized with a dedicated hardware or controller.

However, with wide application of cloud computing, the traditional data backup system is facing an enormous challenge. In a modern cloud computing environment, all resources are dynamically configured and applications usually can be dynamically deployed, scheduled and scaled. This may require that the data backup system can be quickly configured, dynamically mapped with instances of an application regardless of scale-in, scale-out or movement of the instances of the application across nodes, and easily scaled to support massive application instances, etc. In addition, in such a large-scale and dynamically changed environment, management of the data backup system should be as simple and transparent as possible, thereby avoiding extra management overheads. Meanwhile, the data backup system also should meet traditional requirements on performance and functionalities, such as a requirement on backup window (e.g., RTO/RPO) and a requirement on a media control operation (e.g., supporting deduplication, compression or encryption functions, etc.) as much as possible and be compatible with legacy statically deployed applications as much as possible, etc.

SUMMARY

Embodiments of the present disclosure provide a method and an apparatus for data backup.

According to a first aspect of the present disclosure, there is provided a method for data backup. The method comprises selecting, from a service store, a backup service for an application. The method further comprises setting, for the application, configuration information associated with the selected backup service. Additionally, the method further comprises in response to the backup service being enabled, deploying a backup service agent corresponding to the backup service to a source node associated with the application based on the configuration information, such that data of the application is backed up from the source node to a target node via the backup service agent.

According to a second aspect of the present disclosure, there is provided an apparatus for data backup. The apparatus comprises at least one processing unit and at least one memory. The at least one memory is coupled to the at least one processing unit and stores instructions to be executed by the at least one processing unit. The instructions, when executed by the at least one processing unit, cause the apparatus to: select, from a service store, a backup service for an application; set, for the application, configuration information associated with the selected backup service; and in response to the backup service being enabled, deploy a backup service agent corresponding to the backup service to a source node associated with the application based on the configuration information, such that data of the application is backed up from the source node to a target node via the backup service agent.

According to a third aspect of the present disclosure, there is provided a computer program product that is tangibly stored on a non-transient computer readable medium and includes machine-executable instructions. The machine-executable instructions, when being executed, cause the machine to execute any step of the method described according to the first aspect of the present disclosure.

This Summary is provided to introduce a selection of concepts that will be further described in Detailed Description of Embodiments below. This Summary is not intended to identify key features or essential features of the present disclosure or limit the scope of the present disclosure.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements.

DETAILED DESCRIPTION OF EMBODIMENTS

Preferred embodiments of the present disclosure will be described as follows in greater detail with reference to the drawings. Although preferred embodiments of the present disclosure are illustrated in the drawings, it is to be understood that the present disclosure described herein can be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others can denote different or identical objects. The following text may also contain other explicit or implicit definitions.

As described above, the traditional data backup system is usually implemented as a hardware with a tight-couple software, which is constructed for a certain purpose. Therefore, various requirements of a modern cloud computing environment with respect to the data backup system cannot be well met. For example, it is difficult for the traditional data backup system to be rapidly configured, dynamically mapped with instances of an application, and scaled to support massive application instances.

In order to solve one or more of the above and other potential problems, exemplary embodiments of the present disclosure provide a solution for data backup. The solution may register the data backup as a service and implements the backup of data of an application from a source node to a target node via a backup service agent, which is deployed to the source node associated with the application and encapsulated into an executable container.

Figure 1:
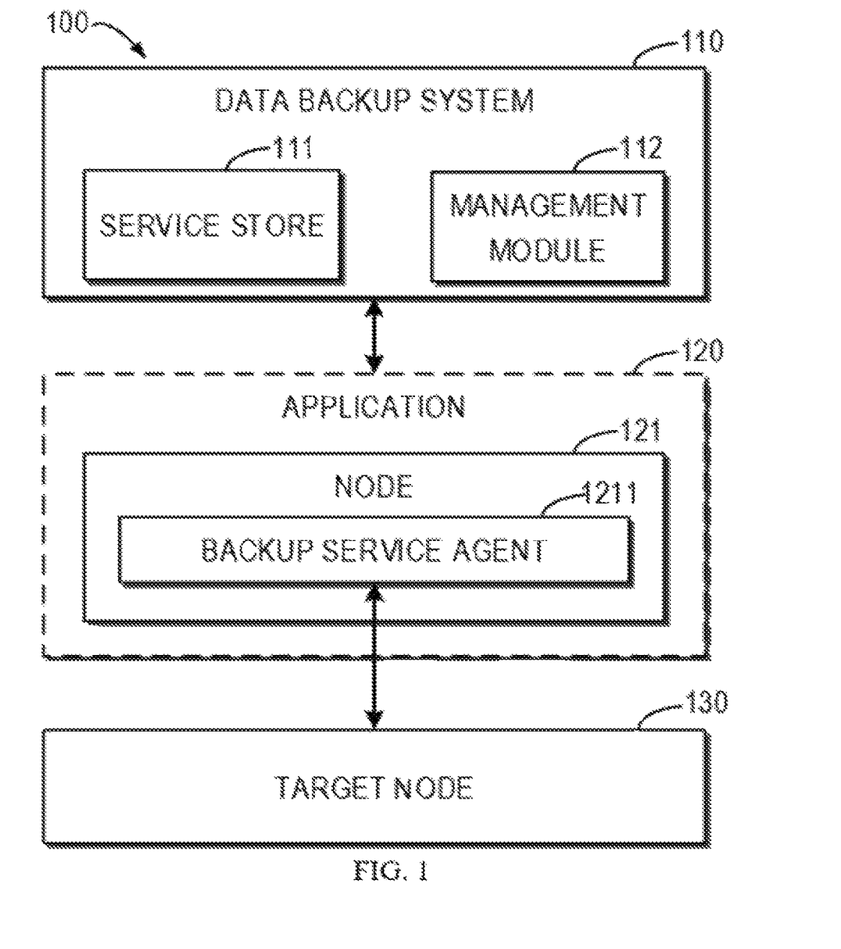
FIG. 1 is a block diagram of an architecture 100 for data backup according to embodiments of the present disclosure.

FIG. 1 illustrates a block diagram of an architecture 100 for data backup according to embodiments of the present disclosure. It should be understood that the structure and/or functions of the architecture 100 are only described for exemplary purposes, not intended for any limitation to the scope of the present disclosure. The embodiments of the present disclosure may be embodied in different structures and/or functions.

As illustrated in FIG. 1, the architecture 100 may comprise a data backup system 110 that may provide a data backup service to the application 120. For example, the application 120 may include a database application or any other type of application. The application 120 may only comprise one instance and may be deployed on a single node. As used herein, the "node" refers to any computer, physical host, virtual machine or other device. For example, as shown in FIG. 1, the application 120 is deployed on the node 121. Alternatively, the application 120 may also comprise a plurality of instances and may be deployed on a plurality of nodes (not shown in FIG. 1). The data backup system 110 may comprise a service store 111 and a management module 112.

The service store 111 may be a high-availability cluster for maintaining backup services and other services for the application. For example, a developer of the backup service may register the backup service with the service store 111. The service store 111 may provide a list of services to the management module 112 and/or the application 120, such that the management module 112 and/or the application 120 can discover a service that is stored on the service store 111. Alternatively or additionally, the application 120 may also register its own services with the service store 111 so as to track and store running states (e.g., events such as an instance of the application 120 is launched, shut down, moved across nodes, fails and so on) of the application 120.

The management module 112 may be a data center-level control and management platform, which provides functions such as resource provisioning, configuration information setting and so on, and a corresponding dashboard. For example, with the management module 112, an administrator of the application 120 may select, from the service store 111, a backup service for the application 120. In addition, the management module 112 may also provide a setting interface for setting configuration information associated with the backup service for the application 120. The management module 112 may be communicatively coupled with the service store 111. When the backup service for the application 120 is enabled, the management module 112 may cause the service store 111 to deploy the backup service agent 1211 corresponding to the backup service for the application 120 to a node associated with the application 120, for example, the node 121 as shown in FIG. 1. The management module 112 may provide a mechanism such as a button to facilitate the user to interactively enable the backup service for the application 120. Alternatively or additionally, it may also be set by the management module 112 to automatically enable the backup service for the application 120 when the application 120 is launched.

The backup agent server 1211 may be encapsulated into a lightweight executable container, e.g., a Docker container. The term "container" used here refers to a kind of virtualized technology that encapsulates an application and a running environment on which the application relies. The Docker container may usually created from a Docker image. The Docker container can be run, suspended, deleted or moved, so as to facilitate being deployed on different platforms. The backup service agent 1211 may act as a backup service client which connects the application 120 and a backup target of the application 120. The backup target of the application 120 may be a reliable data store, which may be usually located in a separate region or located at a remote station including a separate cloud for disaster recovery.

The backup target of the application 120 may consist of multiple nodes and massive physical disks and/or logical disks. Only for exemplary purposes, the backup target of the application 120 in FIG. 1 is illustrated as a target node 130. When the backup service agent 1211 is deployed at the node 121 associated with the application 120, data of the application 120 may be backed up to the target node 130 from the node 121 via the backup service agent 1211. Additionally, the backup service agent 1211 may also cooperate with the target node 130 to implement some pre-processing logics, e.g., data deduplication, compression, and encryption, etc. The backup service agent 1211 can be quickly scheduled, which implements loose coupling between the application 120 and the target node 130, such that the application 120 needn't care about specific backup logics and associated configuration information.

Figure 2:
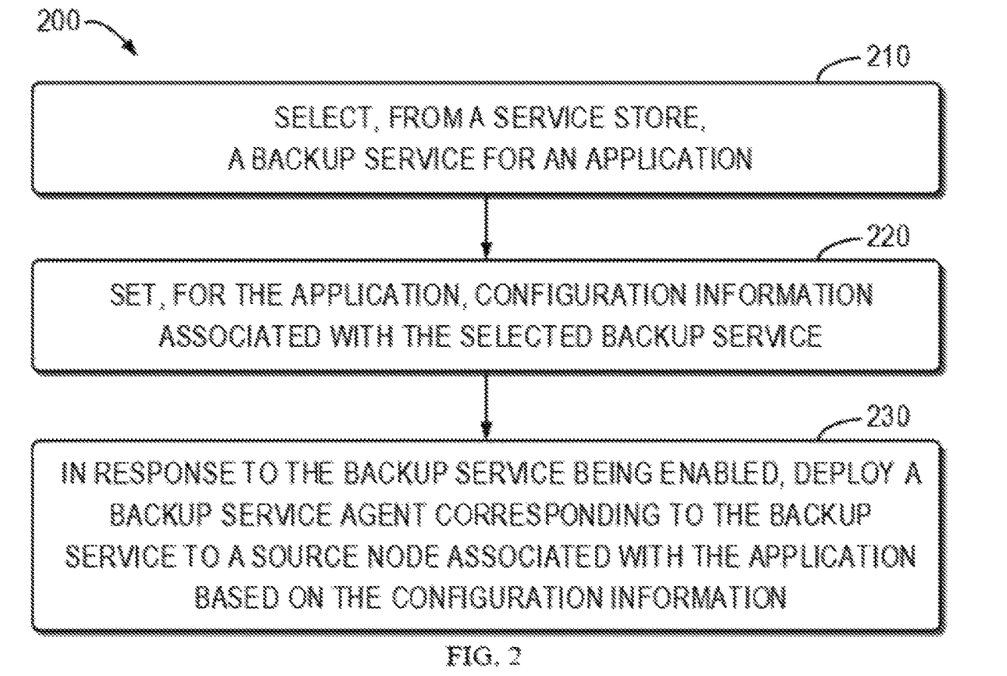
FIG. 2 is a flowchart of a method 200 for data backup according to embodiments of the present disclosure.

Hereinafter, FIGS. 2-6 will be referenced to describe the embodiments of the present disclosure in further detail. FIG. 2 is a flow diagram of a method 200 for data backup according to an embodiment of the present disclosure. For example, the method 200 may be executed by the data backup system 110 as shown in FIG. 1. It should be understood that the method 200 may also include additional acts not shown and/or may omit the illustrated acts. The scope of the present disclosure is not limited in this aspect.

In act 210, a backup service for the application 120 is selected by the management module 112 from the service store 111. In some embodiments, for example, a developer of the backup service may register a backup service with the service store 111, and the service store 111 may provide a backup service list to the management module 112 and/or the application 120. Therefore, a backup service list may be obtained by the management module 112 from the service store 111, and the backup service for the application 120 may be selected from the backup service list. By registering the data backup as a service, the embodiments of the present disclosure can satisfy the requirements for fast deploying and flexibly scaling the data backup in the cloud computing environment.

The method 200 proceeds to act 220. In act 220, configuration information associated with the selected backup service is set for the application 120 by the management module 112. In some embodiments, the configuration information may include first configuration information about at least one candidate source node. As used herein, the "source node" refers to an initial node where application data to be backed up is located, i.e., a node where the backup service agent is to be deployed. According to the type, schedule policy and preference of the application 120, the source node, for example, may be selected from the following nodes: a first node shared by a plurality of applications including the application 120 or a second node where at least one instance of the application 120 is located. The mode of the backup service may be determined by setting the first configuration information. For example, when the source node is selected as the first node shared by a plurality of applications including the application 120, it may indicate that the mode of the backup service is a sharing mode (i.e., a plurality of applications may share a same backup service). When the source node is selected as the second node where at least one instance of the application 120 is located, it may indicate that the mode of the backup service is a dedicated mode (i.e., the backup service is only targeted to the application 120).

Besides, as mentioned above, the application 120 may include a plurality of instances and may be deployed on a plurality of nodes. In some embodiments, these nodes are coordinate, and data thereon may be subjected to read and write operations. In other words, these nodes do not distinguish between master and replica. Instead, they substantially implement the same functions and/or operations. In this case, the first configuration information may be set to select the source node as any of these nodes. In other words, the application data on the selected readable and writable node is to be backed up. In some embodiments, these nodes are not coordinate. For example, these nodes may consist of "a master node" and "a replica node", and the data on the master node are readable and writable, while the data on the replica node is read-only. In this case, the first configuration information may be set to select the source node as a replica node, thereby saving computation resources on the master node.

Alternatively and additionally, in some embodiments, the configuration information may also include second configuration information about the target node. As used herein, the "target node" refers to a destination node to which the application data is to be backed up. In some embodiments, the second configuration information may include account information for the target node (e.g., the target node 130 shown in FIG. 1), such as authorization and authentication information, etc. In some embodiments, the second configuration information may also include a media control operation to be executed by the target node (e.g., executed through cooperation between the target node 130 and the backup service agent 1211), such as data deduplication, compression, encryption, and verification, etc. Therefore, the embodiments of the present disclosure can take into account the functional requirements of the traditional data backup system.

Alternatively or additionally, in some embodiments, the configuration information may also include third configuration information about the backup service agent. For example, the third configuration information may indicate whether the data of the application 120 is to be cached in the backup service agent 1211. If the backup service agent 1211 is set in a cache mode, the data of the application 120 will be cached in the backup service agent 1211. The backup service agent 1211 will not forward cached data to the target node 130 until the amount of the cached data reaches a predetermined threshold. If the backup service agent 1211 is set in a non-cache mode, the data of the application 120 will be directly forwarded to the target node 130 by the backup service agent 1211.

Figure 3A:
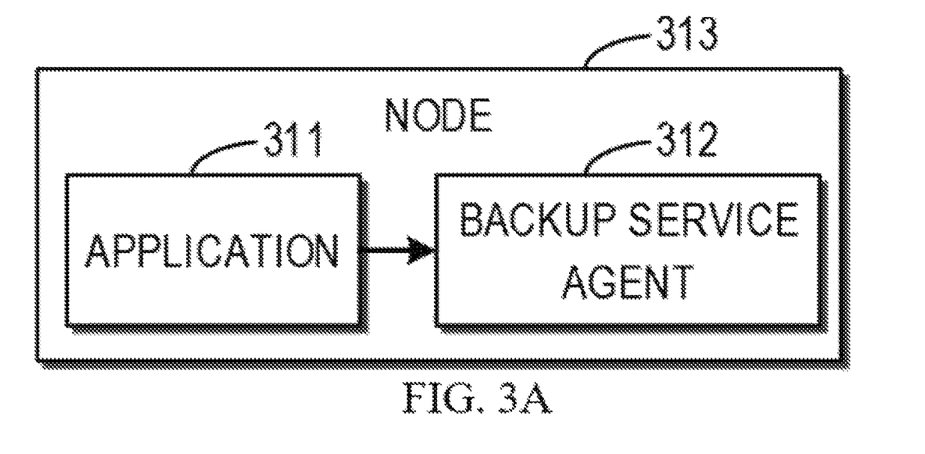
FIGS. 3A-3C are schematic diagrams of various data transmission modes between an application and a backup service agent according to embodiments of the present disclosure.
Figure 3B:
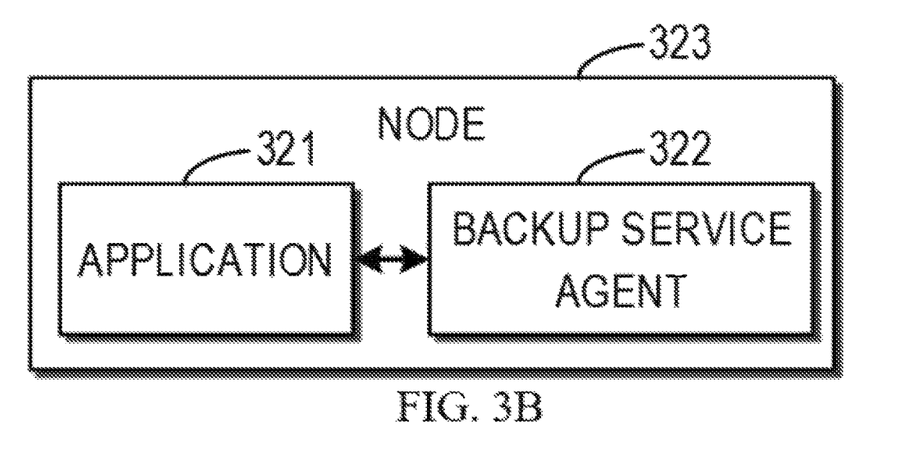
Figure 3C:
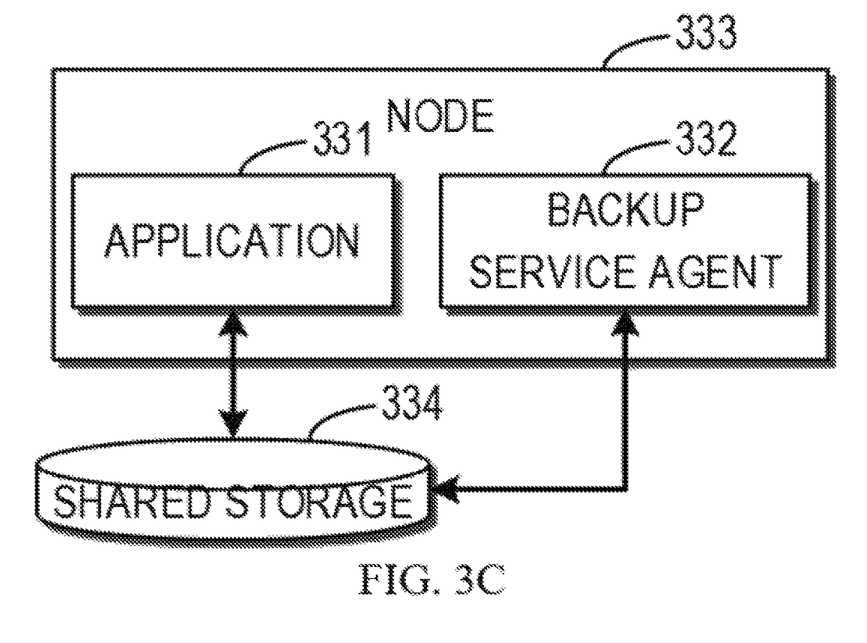

Alternatively or additionally, in some embodiments, the configuration information may also include fourth configuration information about a data transmission mode between the application 120 and the backup service agent 1211. For example, the data transmission mode may include a push mode, a pull mode, a shared storage mode, etc. For example, FIGS. 3A-3C show schematic diagrams of various data transmission modes between an application and a backup service agent according to embodiments of the present disclosure. Only for the purpose of illustration, when various data transmission modes are shown in FIGS. 3A-3C, each of the applications 311, 321, and 331 may only include one instance, and a respective backup service agent (e.g., backup service agents 312, 322 and 332) are deployed in a node (e.g., nodes 313, 323, and 333) where the instance is deployed. It should be understood that various data transmission modes as shown in FIGS. 3A-3C may also be applied to other deployment types. Moreover, the scope of the present disclosure will not be limited in this aspect.

The data transmission mode as shown in FIG. 3A is the push mode. In this mode, if data of the application 311 changes, the application 311 may actively push to the service agent 312 the data that is to be backed up. The data transmission mode as shown in FIG. 3B is the pull mode, in which the backup service agent 322 may actively pull the changed data from the application 321. For example, a daemon may be run on the backup service agent 322 for pulling the changed data. The data transmission mode as shown in FIG. 3C is the shared storage mode, in which the application 331 and the backup service agent 332 may exchange data via the shared storage 334 (e.g., the shared file system, storage volume or storage block).

In some embodiments, the configuration information may also include fifth configuration information about a schedule for the backup of the data. For example, the fifth configuration information may indicate a frequency for executing the backup of the data, and time for executing the backup of the data, etc. Therefore, the embodiments of the present disclosure can take into account performance requirements (e.g., RTO/RPO, etc.) of the traditional data backup system.

Alternatively or additionally, in some embodiments, the configuration information may also comprise sixth configuration information about a strategy for responding to an event related to the application. For example, the event related to the application 120 may include a first instance of the application 120 being launched. In this case, the sixth configuration information may be set to indicate that existing configuration information is to be applied to the first instance or new configuration information is to be set for the first instance. For example, the existing configuration information may include configuration information being set for other instances of application 120. The event related to the application 120 may also include a second instance of the application 120 being shut down. The causes for the second instance of the application 120 being shut down may include reduction of work load or cost considerations. In this case, the sixth configuration may be set to indicate the backup service associated with the second instance is to be shut down.

Besides, the sixth configuration information may also be set to indicate other actions such as adjusting the existing backup resource setting, for example, adjusting the utilization of the central processing unit (CPU) and/or the memory, etc. The event related to the application 120 may also include a third instance of the application 120 being moved across nodes. For example, the third instance of the application 120 is moved from the first node to the second node. In this case, the sixth configuration information may be set to indicate that the existing configuration information is to be maintained or new configuration information if to be set for the third instance. For example, the sixth configuration information may indicate that whether the backup service agent deployed on the first node for the third instance is to be moved to the second node, or a backup service agent shared by other applications will be used for the third instance that is moved to the second node, etc.

In addition, the event related to the application 120 may also include a failure of a fourth instance of the application 120. In this case, the sixth configuration information may indicate that the backup service agent for the fourth instance is to be set to keep retrying, or with a time-out and to shut down in case of expiring the time-out.

It should be understood that what have been described above are only several examples of the configuration information set in act 220. The above examples are described only for enabling those skilled in the art to understand the idea and principle of the present disclosure, not invented to limit the scope of the present disclosure in any manner. Based on the teachings provided here, configuration information including any alternative or additional contents may be configured. By providing a flexible configuration for backup service, the embodiments of the present disclosure implement a dynamic mapping between the backup service agent and the application instance, such that the backup service can be adapted to various dynamic changes of the application (e.g., increase, decrease, or cross-node movement of the instances of the application) and can be easily scaled to support a considerable amount of application instances.

Continuing to refer to FIG. 2, in act 230, in response to the backup serving being enabled, the backup service agent 1211 corresponding to the backup service is deployed by the data backup system 110 to the source node (e.g., the node 121 shown in FIG. 1) associated with the application 120 based on the configuration information. In some embodiments, the deploying action may be performed by the service store 111 in the data backup system 110. In this way, the data of the application 120 can be backed up from the source node 121 to the target node 130 via the backup service agent 1211.

As mentioned above, the backup service agent may exactly correspond to the backup service and may be encapsulated into a lightweight executable container, e.g., a Docker container. The encapsulated backup service agent may include an executable image and a descriptive file about the image. The executable Docker image for example may be run in response to a "docker run" command. The format of the descriptive file for example may include JavaScript-based lightweight data exchange format (JSON) or yml format (which is in Yet Another Markup Language (YAML)). The descriptive file may provide the following information: service name, capability description (such as data deduplication, compression, whether to export shared storage, being able to cache or not, etc.), running mode (such as the push mode, the pull mode, the shared storage mode, and associated ports, etc.), resource requirements (such as CPU, memory, network, disk IO and so on as desired), and a method for checking a health state (such as a port for an external schedule logic to check whether the backup service agent works well, etc.). When the service store 111 is registered with a backup service, the encapsulated backup service agent corresponding to the backup service may be stored for example in the service store 111 or at other location, and information about the location may be provided to the service store 111.

The management module 112 may enable the backup service for the application 120. In response, the service store 111 may deploy the backup service agent 1211 to the source node associated with the application 120 based on the configuration information. As mentioned above, the configuration information may include first configuration information about at least one candidate source node. Therefore, the service store 111 may determine, from the at least one candidate source node and based on the first configuration information, the source node to which the backup service agent 1211 is to be deployed, and deploy the backup service agent 1211 to the determined source node. In some embodiments, the backup service agent 1211 may be deployed to a node shared by a plurality of applications including the application 120. In some other embodiments, the backup service agent 1211 may be deployed to a node where at least instance of the application 120 is deployed.

Figure 4A:
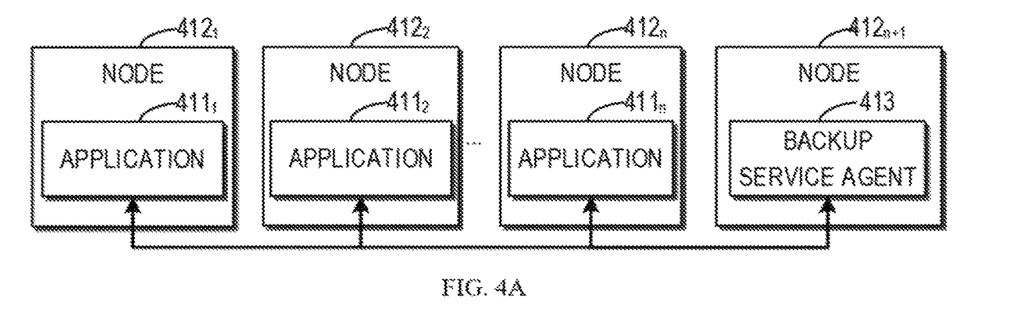
FIGS. 4A-4B are schematic diagrams of various deployment types for a backup service agent according to embodiments of the present disclosure.
Figure 4B:
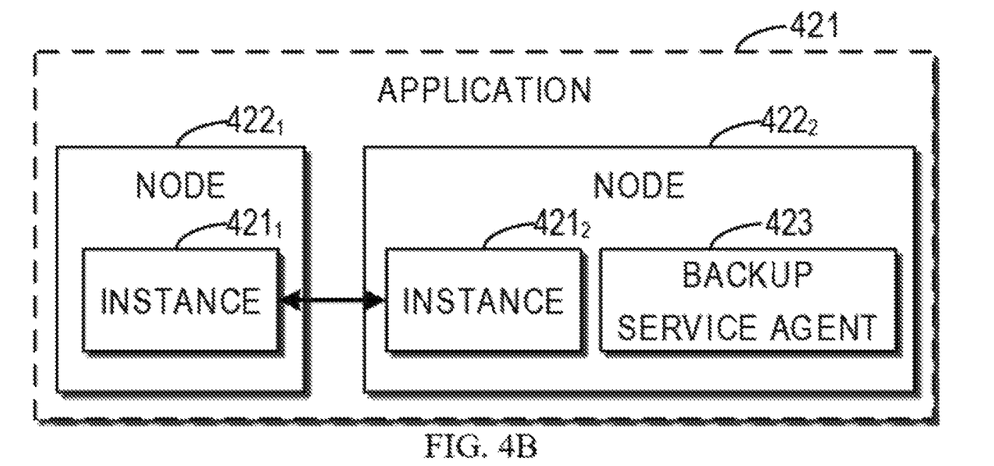

For example, FIGS. 4A-4B are schematic diagrams of various deployment types of a backup service agent according to embodiments of the present disclosure. In an embodiment, as shown in FIG. 4A, the deployment type may include a shared type. In such embodiment, the backup service agent 413 may be deployed to a node $412_{n+1}$ shared by a plurality of applications (for example, applications $411_1, 411_2 \ldots 411_n$ as shown in FIG. 4). The shared node $412_{n+1}$ may be a node which is physically separate from the nodes where the plurality of applications are deployed (e.g., nodes $412_1, 412_2, \ldots 412_n$ as shown in FIG. 4). For example, the backup service agent 413 deployed on the shared node $412_{n+1}$ may communicate with the plurality of applications $411_1, 411_2 \ldots 411_n$ via a transmission control protocol/Internet protocol (TCP/IP) or shared storage.

In an embodiment, as shown in FIG. 4B, the deployment type may include a dedicated type. In this embodiment, the backup service agent 423 may be deployed to a node where at least one instance of the application 421 is deployed. For example, as shown in FIG. 4B, the application 421 may have two instances $421_1$ and $421_2$, in which the instance $421_1$ is deployed at the node $422_1$ while the instance $421_2$ is deployed at the node $422_2$. In particular, in this example, the node $422_1$ is a master node (i.e., a readable and writable node), and the node $422_2$ is a replica node (i.e., a read-only node). In this case, the backup service agent 423 may be deployed in the replica node $422_2$ for the application 421.

It should be understood that the deployment types as shown in FIGS. 4A and 4B are only for purposes of illustration, without suggesting any limitation to the scope of the present disclosure. For example, in some embodiments, a plurality of instances of the application may be deployed on a plurality of coordinate readable and writable nodes, respectively. The backup service agent for the application may be deployed on each of the plurality of readable and writable nodes. Only for the purpose of simplification, such deployment type is not shown in FIGS. 4A and 4B.

Figure 5:
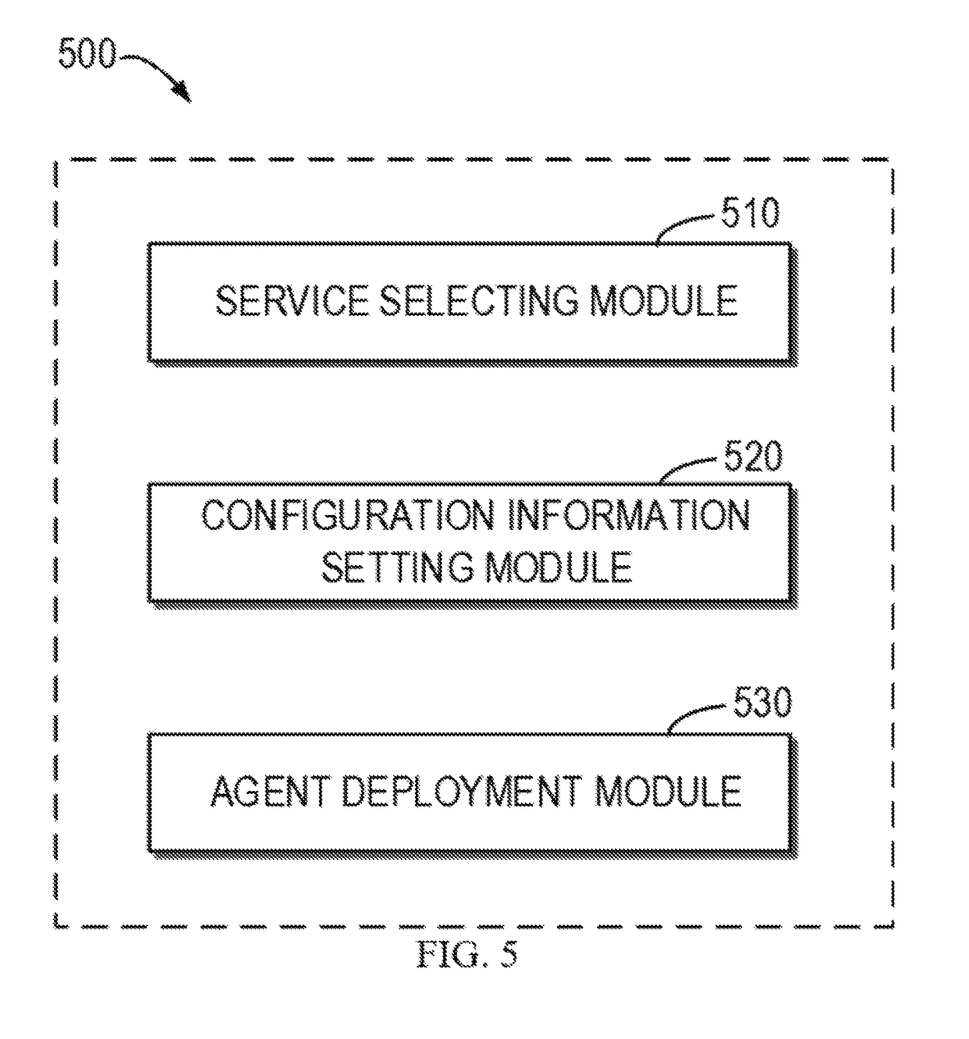
FIG. 5 is a block diagram of an apparatus 500 for data backup according to embodiments of the present disclosure.

FIG. 5 is a block diagram of an apparatus 500 for data backup according to an embodiment of the present disclosure. For example, the data backup system 110 may be implemented by the apparatus 500. As shown in FIG. 5, the apparatus 500 may comprise a service selecting module 510 configured to select, from a service store, a backup service for an application. The apparatus 500 may also comprise a configuration information setting module 520 configured to set, for the application, configuration information associated with the selected backup service. Besides, the apparatus 500 may also comprise a agent deployment module 530 configured to, in response to the backup service being enabled, deploy a backup service agent corresponding to the backup service to a source node associated with the application based on the configuration information, such that data of the application is backed up from the source node to a target node via the backup service agent.

For the sake of clarity, FIG. 5 does not show some optional modules of the apparatus 500. However, it should be understood that various features described above with reference to FIGS. 1-4 are also applicable to the apparatus 500. Moreover, various modules of the apparatus 500 may be hardware modules or software modules. For example, in some embodiments, the apparatus 500 may be partially or completely implemented using software and/or firmware, e.g., implemented as a computer program product embodied on a computer readable medium. Alternatively or additionally, the apparatus 500 may be partially or completely implemented based on hardware, e.g., implemented as an integrated circuit (IC), an application-specific integrated circuit (ASIC), a system on chip (SOC), a field programmable gate array (FPGA), etc. The scope of the present disclosure will not be limited in this aspect.

Figure 6:
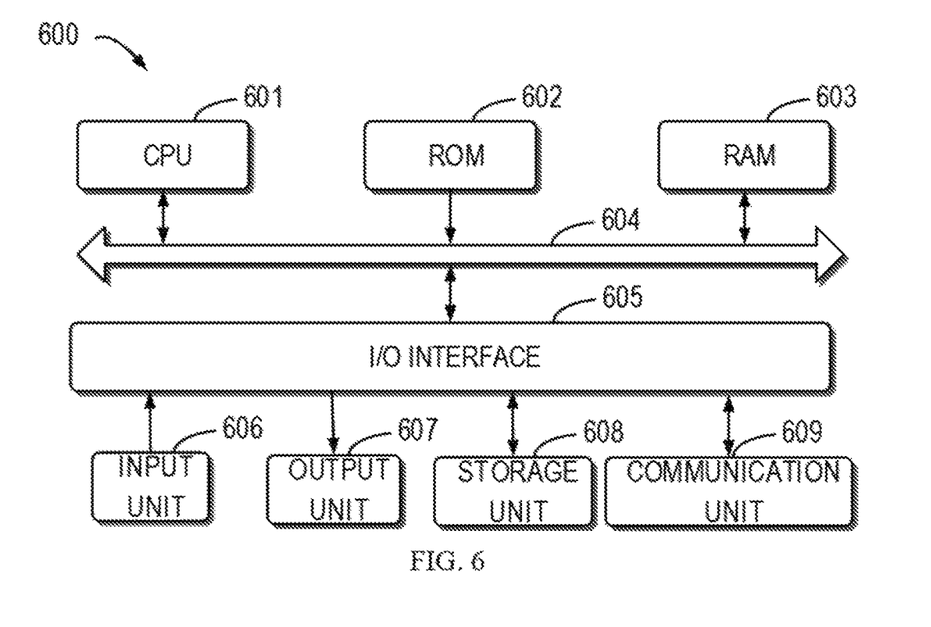
FIG. 6 is a schematic block diagram of an exemplary device 600 that can be used to implement embodiments of the present disclosure.

FIG. 6 is a schematic block diagram of an exemplary device 600 that may be used to implement the embodiments of the present disclosure. As shown in FIG. 6, the apparatus 600 comprises a central processing unit (CPU) 601 that may perform various appropriate actions and processing based on computer program instructions stored in a read-only memory (ROM) 602 or computer program instructions loaded from a memory unit 608 to a random access memory (RAM) 603. In the RAM 603, there further store various programs and data needed for operations of the device 600. The CPU 601, ROM 602 and RAM 603 are connected to each other via a bus 604. An input/output (I/O) interface 605 is also connected to the bus 604.

Various components in the device 600 are connected to the I/O interface 605, including: an input 606 such as a keyboard, a mouse and the like; an output unit 607 including various kinds of displays and a loudspeaker, etc.; a memory unit 608 including a magnetic disk, an optical disk, and etc.; a communication unit 609 including a network card, a modem, and a wireless communication transceiver, etc. The communication unit 609 allows the device 600 to exchange information/data with other devices through a computer network such as the Internet and/or various kinds of telecommunications networks.

Various processes and processing described above, e.g., method 200, may be executed by the processing unit 601. For example, in some embodiments, the method 200 may be implemented as a computer software program that is tangibly embodied on a machine readable medium, e.g., the storage unit 608. In some embodiments, part or all of the computer program may be loaded and/or mounted onto the device 600 via ROM 602 and/or communication unit 609. When the computer program is loaded to the RAM 603 and executed by the CPU 601, one or more steps of the at least one of the method 200 as described above may be executed.

In view of the above, by registering the data backup as a service, the embodiments of the present disclosure can satisfy the requirements for fast deploying and flexibly scaling the data backup in the cloud computing environment. By backing up data of an application from a source node to a target node via a backup service agent encapsulated into an executable container, embodiments of the present disclosure can implement loose coupling between the application and the target node. By providing a flexible configuration for backup service, the embodiments of the present disclosure implement a dynamic mapping between the backup service agent and the application instance, such that the backup service can be adapted to various dynamic changes of the application (e.g., increase, decrease, or cross-node movement of the instances of the application) and can be easily scaled to support a considerable amount of application instances. In addition, the data backup solution of the embodiments of the present disclosure can meet traditional requirements on performance and functionalities, such as a requirement on backup window (e.g., RTO/RPO), a requirement on a media control operation (e.g., supporting deduplication, compression or encryption functions, etc.) and the like, and thus be compatible with legacy statically deployed applications.

The present disclosure may be a method, apparatus, system and/or computer program product. The computer program product may include a computer readable medium on which computer readable program instructions for executing various aspects of the present disclosure are embodied.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for data backup using a data storage system using one or more processors and memory, comprising:
    selecting, from a service store at the data storage system, a backup service for an application, wherein the selecting includes:
        obtaining a backup service list from the service store, the backup service list including at least one backup service registered to the service store; and
        selecting, from the backup service list, the backup service for the application;
    setting, for the application, configuration information associated with the selected backup service, wherein setting configuration information associated with the selected backup service comprises setting configuration information about a data transmission mode between the application and the backup service agent, the data transmission mode including at least one of the following:
        a push mode in which the application pushes the data to the backup service agent,
        a pull mode in which the backup service agent pulls the data from the application, and
        a shared storage mode in which the application and the backup service agent exchange the data through shared storage; and
    in response to the backup service being enabled, deploying, based on the configuration information, a backup service agent corresponding to the backup service to a source node associated with the application, such that data of the application is backed up from the source node to a target node via the backup service agent.

2. The method of claim 1, wherein the setting configuration information associated with the selected backup service further comprises:
setting additional configuration information about at least one candidate source node, the at least one candidate source node being selected from: a first node shared by a plurality of applications including the application, or a second node where at least one instance of the application is deployed.

3. The method of claim 2, wherein the deploying a backup service agent corresponding to the backup service to a source node comprises:
determining, based on the first configuration information, the source node from the at least one candidate source node; and
deploying the backup service agent to the determined source node.

4. The method of claim 1, wherein the setting configuration information associated with the selected backup service further comprises:
setting additional configuration information about the target node, the additional configuration information including a media control operation to be executed by the target node.

5. The method of claim 4 wherein the media control operation includes data verification.

6. The method of claim 1, wherein the setting configuration information associated with the selected backup service further comprises:
setting additional configuration information about the backup service agent, the additional configuration information indicating whether the data of the application is to be cached at the backup service agent.

7. The method of claim 1, wherein the setting configuration information associated with the selected backup service further comprises:
setting additional configuration information about a schedule for the backup of the data, the additional configuration information indicating at least one of the following: a frequency for executing the backup of the data, and time for executing the backup of the data.

8. The method of claim 1, wherein the setting configuration information associated with the selected backup service further comprises:
setting additional configuration information about a strategy for responding to an event related to the application, the event including at least one of the following:
a first instance of the application being launched;
a second instance of the application being shut down;
a third instance of the application being moved across nodes; and
a failure of a fourth instance of the application.

9. The method of claim 1, wherein the backup service agent is encapsulated into an executable container, and the container includes a Docker container.

10. The method of claim 1 wherein the service store is a high-availability cluster for maintaining backup services and other services for the application.

11. An apparatus for data backup, comprising:
at least one processing unit;
at least one memory coupled to the at least one processing unit and storing instructions to be executed by the at least one processing unit, the instructions, when being executed by the at least one processing unit, cause the apparatus to:
select, from a service store, a backup service for an application, wherein the selecting includes:
obtaining a backup service list from the service store, the backup service list including at least one backup service registered to the service store; and
selecting, from the backup service list, the backup service for the application;
set, for the application, configuration information associated with the selected backup service, wherein setting configuration information associated with the selected backup service comprises setting configuration information about a data transmission mode between the application and the backup service agent, the data transmission mode including at least one of the following:
a push mode in which the application pushes the data to the backup service agent,
a pull mode in which the backup service agent pulls the data from the application, and
a shared storage mode in which the application and the backup service agent exchange the data through shared storage; and
in response to the backup service being enabled, deploy, based on the configuration information, a backup service agent corresponding to the backup service to a source node associated with the application, such that data of the application is backed up from the source node to a target node via the backup service agent.

12. The apparatus of claim 11, wherein the setting configuration information associated with the selected backup service further comprises:
setting additional configuration information about at least one candidate source node, the at least one candidate source node being selected from: a first node shared by a plurality of applications including the application, or a second node where at least one instance of the application is deployed.

13. The apparatus of claim 12, wherein deploying the backup service agent to the source node based on the configuration information comprises:
determining, based on the first configuration information, the source node from the at least one candidate source node; and deploying the backup service agent to the determined source node.

14. The apparatus of claim 11, wherein the setting configuration information associated with the selected backup service further comprises:
setting additional configuration information about the target node, the additional configuration information including a media control operation to be executed by the target node.

15. The apparatus of claim 11, wherein the setting configuration information associated with the selected backup service further comprises:
setting additional configuration information about the backup service agent, the additional configuration information indicating whether the data of the application is to be cached at the backup service agent.

16. The apparatus of claim 11, wherein the setting configuration information associated with the selected backup service further comprises:
setting additional configuration information about a schedule for the backup of the data, the additional configuration information indicating at least one of the following: a frequency for executing the backup of the data, and time for executing the backup of the data.

17. The apparatus of claim 11, wherein the setting configuration information associated with the selected backup service further comprises:
 setting additional configuration information about a strategy for responding to an event related to the application, the event including at least one of the following:
 a first instance of the application being launched;
 a second instance of the application being shut down;
 a third instance of the application being moved across nodes; and
 a failure of a fourth instance of the application.

18. The apparatus of claim 11, wherein the backup service agent is encapsulated into an executable container, and the container includes a Docker container.

\* \* \* \* \*